(12) United States Patent
Lampe et al.

(10) Patent No.: US 9,708,541 B2
(45) Date of Patent: Jul. 18, 2017

(54) MULTI-LEVEL FURNACE AND METHOD FOR THERMAL TREATMENT OF A MATERIAL FLOW

(71) Applicant: ThyssenKrupp Industrial Solutions AG, Essen (DE)

(72) Inventors: Karl Lampe, Ennigerloh (DE); Yilmaz Karakus, Ahlen (DE); Jürgen Denker, Beckum (DE); Peter Fleuter, Ahlen (DE)

(73) Assignee: ThyssenKrupp Industrial Solutions AG, Essen (DE)

( * ) Notice: Subject to any disclaimer, the term of this patent is extended or adjusted under 35 U.S.C. 154(b) by 70 days.

(21) Appl. No.: 14/443,183

(22) PCT Filed: Nov. 8, 2013

(86) PCT No.: PCT/EP2013/073349
§ 371 (c)(1),
(2) Date: May 15, 2015

(87) PCT Pub. No.: WO2014/076000
PCT Pub. Date: May 22, 2014

(65) Prior Publication Data
US 2015/0307782 A1    Oct. 29, 2015

(30) Foreign Application Priority Data

Nov. 16, 2012    (DE) .................. 10 2012 111 050

(51) Int. Cl.
*C10L 9/00* (2006.01)
*C10B 7/10* (2006.01)
(Continued)

(52) U.S. Cl.
CPC ............... *C10B 7/10* (2013.01); *B01J 8/002* (2013.01); *B01J 8/0045* (2013.01); *B01J 8/10* (2013.01);
(Continued)

(58) Field of Classification Search
CPC ... C10B 7/10; C10B 7/02; C10B 57/14; B01J 8/10; B01J 8/125; B01J 8/002;
(Continued)

(56) References Cited

U.S. PATENT DOCUMENTS 2,104,526 A * 1/1938 Raisch ................. F23G 5/28
                                                    110/225
2,869,249 A     1/1959 Kamp
(Continued)

FOREIGN PATENT DOCUMENTS

DE    4232684 A1    3/1994
DE    4427180 A1    2/1996
(Continued)

*Primary Examiner* — Cephia D Toomer
(74) *Attorney, Agent, or Firm* — The Webb Law Firm

(57) ABSTRACT

The invention relates to a multi-level furnace for thermal treatment of the material flow which has at least two process chambers arranged one above another, each providing at least two level floors, and is equipped with one or more transfer devices for transferring the treated material flow from an upper process chamber to a lower process chamber. In order to separate the two process chambers in terms of gas flow, the transfer device has means for forming a material column in the transition region between the upper and the lower process spaces, wherein said means for forming a material column comprise at least one conveying unit or at least one chute, and the at least one conveying unit or at least one chute also forms a material removal device for the upper process chamber and/or a material input device for the lower process chamber.

7 Claims, 4 Drawing Sheets

(51) Int. Cl.
  *B01J 8/10* (2006.01)
  *B01J 8/12* (2006.01)
  *B01J 8/00* (2006.01)
  *C10L 9/08* (2006.01)
  *C10B 7/02* (2006.01)
  *F26B 17/00* (2006.01)
  *F27B 9/02* (2006.01)
  *F27B 9/14* (2006.01)
  *F27B 9/18* (2006.01)
  *F27D 3/08* (2006.01)
  *C10B 57/14* (2006.01)

(52) U.S. Cl.
  CPC ............... *B01J 8/125* (2013.01); *C10B 7/02* (2013.01); *C10B 57/14* (2013.01); *C10L 9/08* (2013.01); *C10L 9/083* (2013.01); *F26B 17/003* (2013.01); *F27B 9/028* (2013.01); *F27B 9/142* (2013.01); *F27B 9/18* (2013.01); *F27D 3/08* (2013.01); *B01J 2208/0084* (2013.01); *B01J 2208/00699* (2013.01); *B01J 2208/00752* (2013.01); *B01J 2208/00761* (2013.01); *B01J 2208/00867* (2013.01); *Y02E 50/14* (2013.01); *Y02E 50/15* (2013.01)

(58) Field of Classification Search
  CPC ............ B01J 8/0045; B01J 2208/00752; B01J 2208/00761; B01J 2208/0084; B01J 2208/00699; B01J 2208/00867; C10L 9/08; C10L 9/083; F26B 17/003; Y02E 50/14; Y02E 50/15; F27B 9/028; F27B 9/142; F27B 9/18; F27D 3/08
  See application file for complete search history.

(56) References Cited

U.S. PATENT DOCUMENTS

| | | | |
|---|---|---|---|
| 3,132,092 | A | 5/1964 | Vaell |
| 5,558,203 | A | 9/1996 | Herm et al. |
| 6,391,088 | B1 * | 5/2002 | Hansmann ............ B22F 1/0011 |
| | | | 75/370 |
| 2004/0123785 | A1 | 7/2004 | Hutmacher et al. |

FOREIGN PATENT DOCUMENTS

| | | |
|---|---|---|
| DE | 102005059856 A1 | 6/2007 |
| EP | 0033971 A2 | 8/1981 |
| WO | 9726495 A2 | 7/1997 |
| WO | 2012007574 A1 | 1/2012 |
| WO | 2013189888 A1 | 12/2013 |
| WO | 2013190053 A1 | 12/2013 |

* cited by examiner

MULTI-LEVEL FURNACE AND METHOD FOR THERMAL TREATMENT OF A MATERIAL FLOW

CROSS-REFERENCE TO RELATED APPLICATIONS

This application is the United States national phase of International Application No. PCT/EP2013/073349 filed Nov. 8, 2013, and claims priority to German Patent Application No. 10 2012 111 050.6 filed Nov. 16, 2012, the disclosures of which are hereby incorporated in their entirety by reference.

BACKGROUND OF THE INVENTION

Field of the Invention

The invention relates to a multi-level furnace and to a method for the thermal treatment of a material flow, preferably a material flow containing carbon.

Description of Related Art

The thermal treatment of a material flow is understood as also meaning in particular a torrefaction, in which biomass is thermally treated by pyrolytic decomposition at relatively low temperatures of 250° to 450° C. with the exclusion of air.

WO 2012/007574 A1 discloses a device and a method for the drying and torrefaction of at least one carbon-containing material flow in a multi-level furnace. The drying and the torrefaction take place there in two different process chambers that are spatially separate from one another. This spatial separation makes it possible for the atmosphere to be specifically set to suit the respective process (drying or torrefaction). In this way, the efficiency, and consequently also the throughput, of the device can be increased significantly. The transfer device provided between the two process chambers is not specified any more precisely in this document. It is however conceivable to realize the gas separation of the process chambers by cellular wheel sluices or double swing valves. However, the installation of these sluices is only possible outside the process chambers, and so a separate furnace is required for each process chamber.

SUMMARY OF THE INVENTION

The invention is therefore based on the object of reducing the structural complexity of the gastight separation of the two process chambers.

The multi-level furnace according to the invention for the thermal treatment of a material flow, preferably a material flow containing carbon, has at least two process chambers arranged one above the other, which respectively provide at least two floors for the levels, and is equipped with one or more transfer devices for transferring the treated material flow from an upper process chamber to a lower process chamber, the transfer device having for the gastight separation of the two process chambers means for forming a column of material in the transitional region between the upper process chamber and the lower process chamber, the means for forming a column of material comprising at least one delivery unit or at least one chute or a slider and the at least one delivery unit or at least one chute at the same time forming a material output device for the upper process chamber and/or a material input device for the lower process chamber.

In the case of the method according to the invention for the thermal treatment of a material flow, preferably a material flow containing carbon, this material flow is treated in a multi-level furnace in at least two process chambers arranged one above the other and separated gastightly from one another and respectively equipped with at least two floors for the levels. The material flow is transferred by a transfer device from an upper process chamber to a lower process chamber, a column of material being formed in the transfer device for the gastight separation of the two process chambers, the forming of the column of material being performed by at least one delivery unit or at least one chute or a slider and the at least one transfer device being used not only for transferring the material flow from the upper process chamber to the lower process chamber but also for discharging at least part of the material flow from the multi-level furnace and/or for introducing material into the multi-level furnace from outside.

Using the material to be treated to ensure the gastight separation of the two process chambers can be realized in a structurally comparatively simple manner. The further advantage is especially also that the transfer device can be realized within the multi-level furnace.

The fact that the at least one delivery unit at the same time forms a material output device for the upper process chamber and/or a material input device for the lower process chamber gives rise to the possibility of being able to discharge partly treated material or feed in additional material while bypassing an upper process chamber.

Further refinements of the invention are the subject of the subclaims.

In this case, at least three process chambers arranged one above the other and at least two delivery units may be provided, the two delivery units being connected to one another in such a way that at least one process chamber arranged between the two delivery units is bypassed. It is also conceivable that one or both delivery units is/are in connection with at least one material store and/or intermediate store.

According to a preferred refinement of the delivery unit, it has a first feed opening, in connection with the upper process chamber, and a first outlet opening, provided at an end region of the delivery unit and in connection with the lower process chamber. Furthermore, a second feeding device may be provided, connected to a material charge, for directly charging filter dust, reject materials, odor-intensive materials or materials for increasing the reactivity or the delivery capacity into the lower process chamber. Furthermore, the delivery unit may also have a second outlet opening, in connection with the area outside the multi-level furnace, for discharging material from the multi-level furnace. The delivery unit or units is/are therefore appropriately equipped with a reversible drive, in order to connect the feed opening to the first or second outlet opening in terms of delivery.

Instead of a delivery unit, according to another exemplary embodiment of the invention the means for forming a column of material may also comprise a chute in which a column of material forms.

For monitoring the gastight separation of the two process chambers, according to a further aspect of the invention it is provided that the differential pressure between the upper process chamber and the lower process chamber is determined. Then there is also the possibility that the delivery rate of the at least one delivery unit is controlled in dependence on the measured differential pressure in such a way that a gastight separation of the two process chambers is ensured.

This gastight separation of the process chambers makes it possible that the temperature and/or the humidity and/or the pressure in the two process chambers can be set individually. The thermal treatment of the material flow in the individual process chambers in this case preferably takes place with the aid of a stream of treatment gas, which is fed to each process chamber and, after acting on the material flow, is removed again. The gastight separation of process chambers lying one above the other provides the possibility of individually setting the direction of flow of the treatment gas with respect to the direction of the material flow, the direction of flow of the treatment gas preferably being set in co-flow in at least one upper process chamber and in counter-flow in at least one lower process chamber. The co-flow treatment is of advantage in particular for the drying of the material flow, while the torrefaction appropriately takes place in counter-flow.

BRIEF DESCRIPTION OF THE DRAWINGS

Further refinements of the invention are explained more precisely below on the basis of the description of a number of exemplary embodiments and the drawing, in which.

DESCRIPTION OF THE INVENTION

Figure 1:
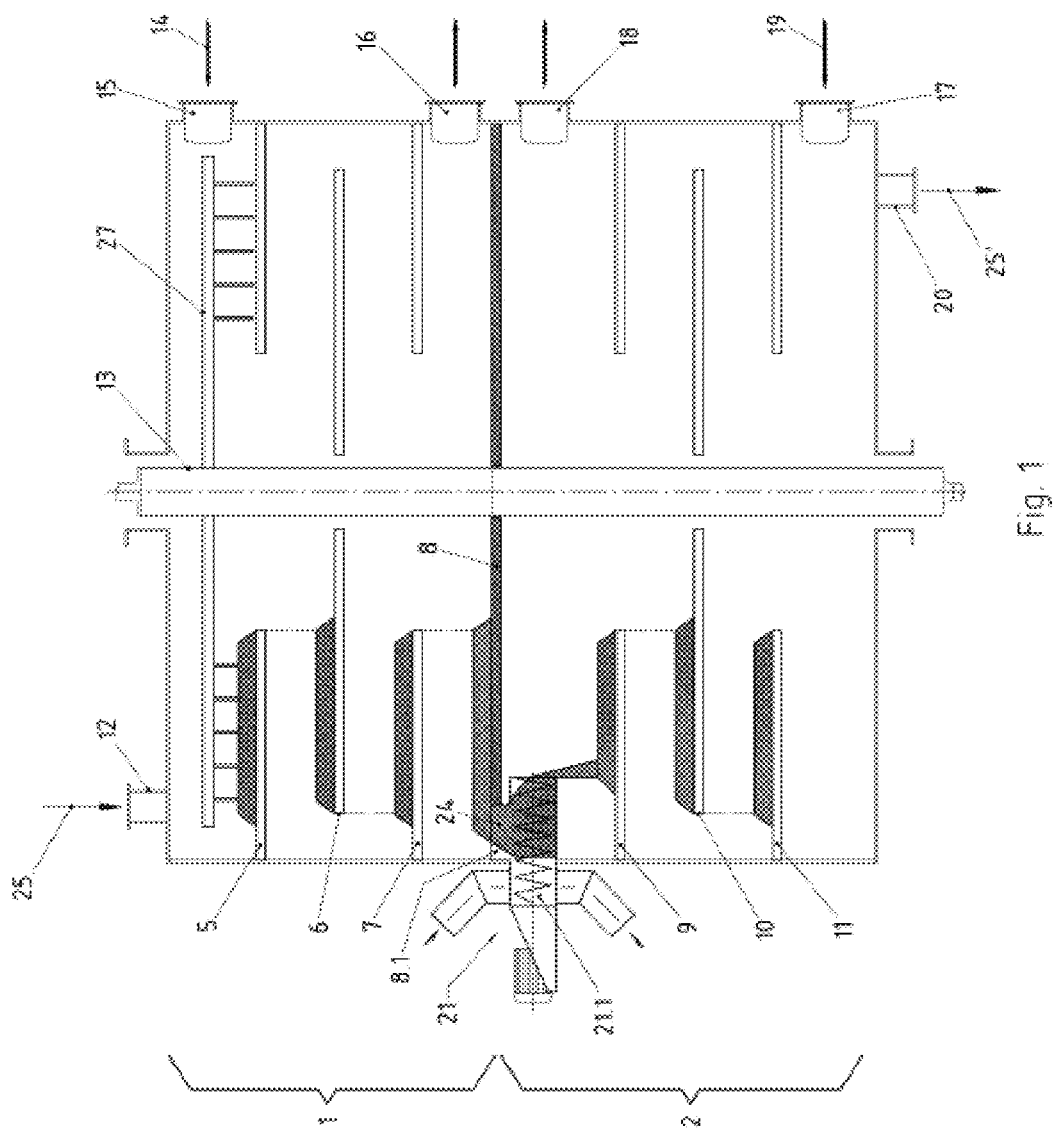
FIG. 1 shows a schematic representation of a multi-level furnace according to a first exemplary embodiment.

The multi-level furnace represented in FIG. 1 for the thermal treatment of a material flow serves for example for the drying and torrefaction of a material flow containing carbon. It has two process chambers 1, 2, which are arranged one above the other and respectively have multiple floors for the levels 5 to 11. The material flow 25 to be treated is fed to the process chamber 1 from above by way of a feeding device 12. The transporting of the material on the floors for the levels takes place by way of customary transporting devices, such as for example a rabble arm system 27 rotating with a central column 13, which transport the material to inner- or outer-lying openings, where the material falls onto the floor for the next-lower level. It is of course also conceivable in principle that the floors for the levels rotate with the central column 13 and interact with fixed strippers. In FIG. 1, only one rabble arm system 27 is represented in the region of the floor for the level 5. It goes without saying that such rabble arm systems may also be provided in the region of the floors for the other levels.

The heat treatment of the material flow 25 in the upper process chamber 1 takes place with the aid of a first stream of treatment gas 14, which is fed in by way of an input 15, provided in the upper region of the process chamber 1, and is removed by way of an output 16, provided in the lower region of the process chamber 1. In the case of this arrangement, the heat treatment takes place in cross-flow or co-flow with the direction of material flow. Depending on the application, however, it may also be appropriate to carry out the heat treatment in counter-flow. It is also conceivable that there are multiple streams of treatment gas, for example a stream of treatment gas is respectively fed in and removed from the floor for each level. In a similar way, a second stream of treatment gas 19 is fed in and removed in the lower process chamber 2 by way of an input 17 and an output 18. Here, the treatment of the material flow takes place in counter-flow with respect to the treatment gas. Here, too, further streams of treatment gas may of course also be fed in and removed. Finally, at the lower end of the lower process chamber 2 there is an output device 20 for the treated material flow 25'.

Provided between the two process chambers 1 and 2 is a transfer device 21, which has a delivery unit 21.1 formed as a delivery screw, in order to transfer the material flow from the upper process chamber 1 to the lower process chamber 2 while forming a column of material 24. The floor for the lowermost level 8 of the upper process chamber 1 at the same time forms the ceiling of the lower level chamber 2. The opening 8.1 in the floor for the level 8 in this case represents the connection between the two process chambers, the delivery unit 21.1 being arranged directly under the opening 8.1.

Figure 2:
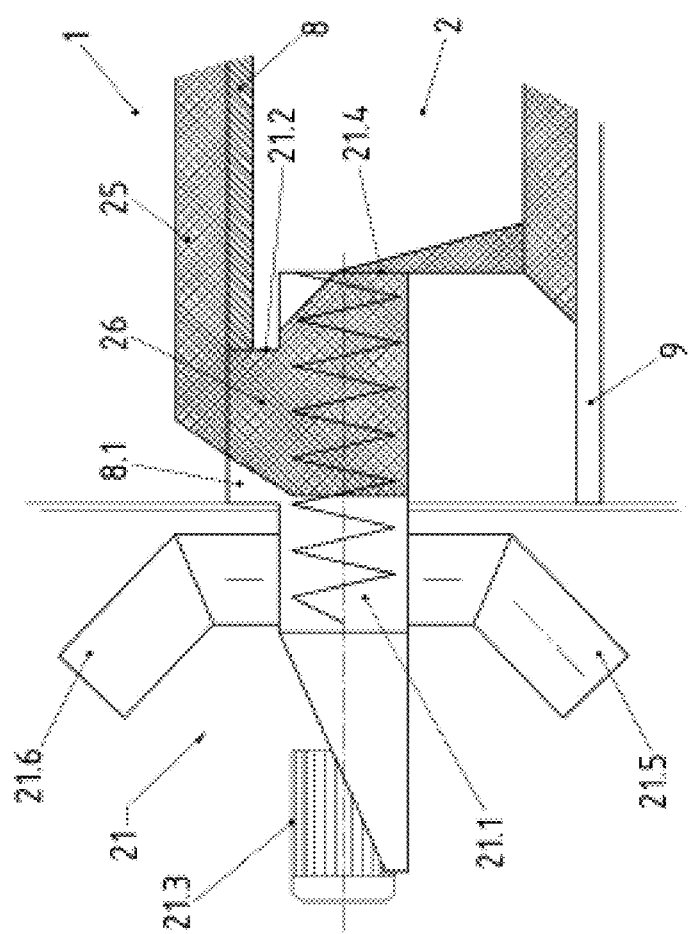
FIG. 2 shows a schematic view of a detail of the transfer device formed as a delivery unit.

Further details are explained more precisely below on the basis of FIG. 2.

The delivery unit 21.1 is in connection with the opening 8.1 in the floor for the level 8 by way of a first feed opening 21.2 in such a way that the material flow 25 located on the floor for the level 8 enters the delivery unit 21.1 by way of the opening 8.1, while forming a column of material 26. The delivery unit 21.1 has a drive 21.3, in order to transport the material flow 25 to a first outlet opening 21.4, arranged at one end of the delivery unit. There, the material flow falls onto the floor for the level 9 of the second process chamber 2. The gastight separation of the two process chambers 1 and 2 is formed by the column of material 26 forming, which in the case of this exemplary embodiment continues in the delivery member 21.1, formed as a delivery screw, up to the first outlet opening 21.4. The delivery rate is controlled by way of the drive 21.3 in such a way that there is always a sufficient column of material 26 to ensure the gastight separation of the two process chambers 1, 2. For this purpose, the differential pressure between the upper process chamber 1 and the lower process chamber 2 could be determined, in order to monitor the gastight separation, the delivery rate of the delivery unit 21.1 being controlled in dependence on the measured differential pressure in such a way that the gastight separation of the two process chambers is ensured.

In the case of the exemplary embodiment represented here, the delivery unit 21.1 is provided at its end opposite from the first outlet opening with a second outlet opening 21.5, which is in connection with the area outside the multi-level furnace. In this way, the reversible drive 21.3 provides the possibility of not transferring at least part of the material flow 25 into the second process chamber 2, but instead discharging it by way of the second outlet opening 21.5. This may be used for example for bypassing at least one process chamber or for discharging at least part of the material flow into a material and/or intermediate store. The second outlet opening 21.5 could also be used for the purpose of taking samples. Furthermore, the delivery unit 21.1 has a second feed opening 21.6, which is provided outside the multi-level furnace and by way of which additional material, such as filter dust, reject materials, odor-intensive materials or materials for increasing the reactivity and the delivery capacity, can be fed to the second process chamber 2. The transfer device 21 consequently serves not only for establishing the gastight separation of the two process chambers but also in the embodiment shown here for discharging and/or feeding in material. The reversible drive 21.3 of the delivery member 21.1 also offers the possibility of responding to a blockage or a jam in the transfer region. There is also the possibility of accelerated discharge of the material flow from the process chamber arranged thereabove, for example in the event of an accident.

The delivery unit 21.1 is in this case preferably formed and arranged in such a way that it is only mounted outside the multi-level furnace, i.e. in a cold region, but the first feed opening 21.2, in connection with the opening 8.1 in the floor for the level 8, and the first outlet opening 21.4 are arranged inside the multi-level furnace. The two process chambers 1 and 2 consequently do not have to be realized in two separate furnaces, but rather can be accommodated in one and the same multi-level furnace.

In the exemplary embodiment represented, the delivery member 21.1 is formed as a delivery screw. However, it is also conceivable within the scope of the invention for it to be formed as a slider.

Figure 3:
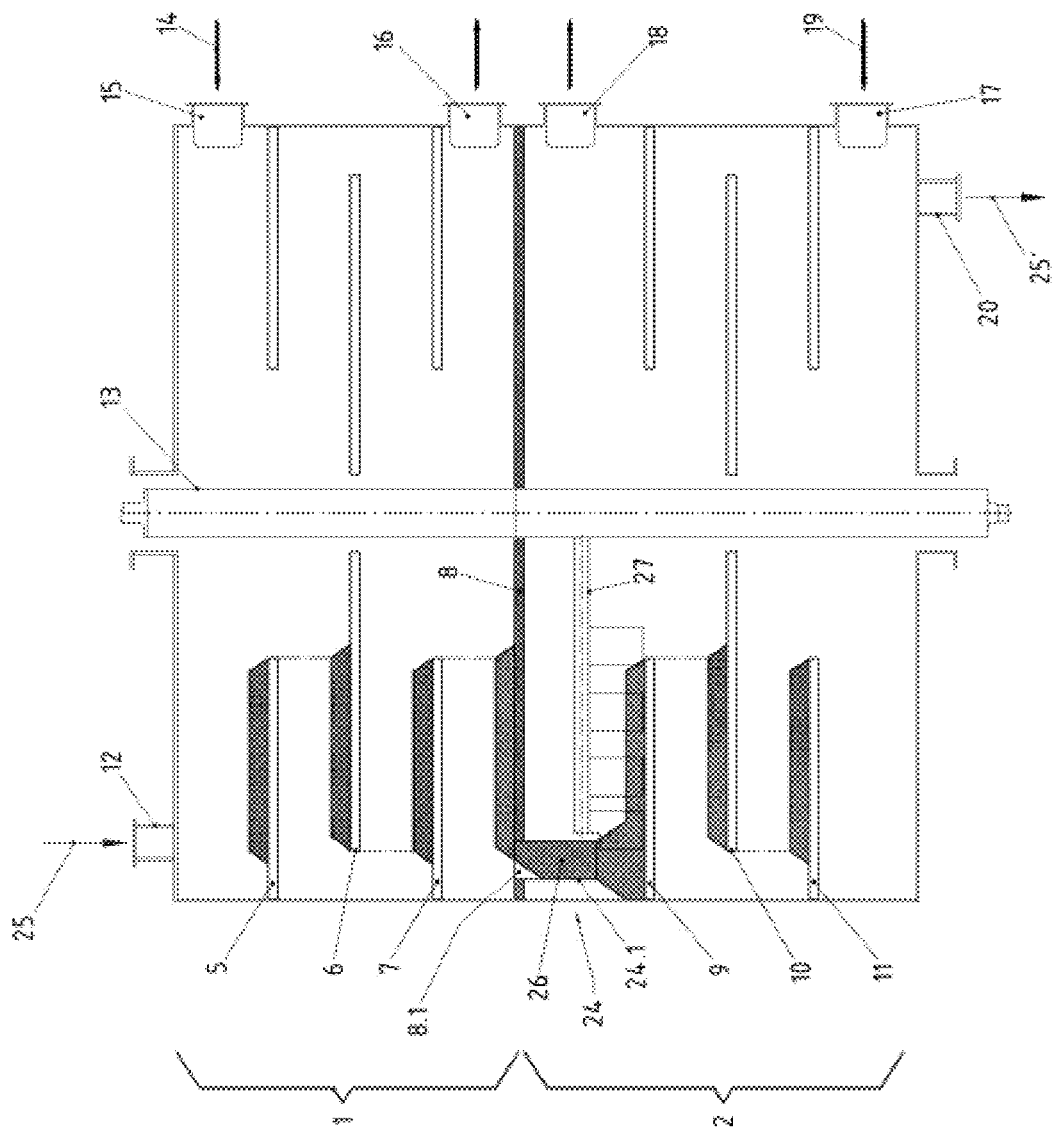
FIG. 3 shows a schematic representation of a multi-level furnace according to a second exemplary embodiment and FIG. 4 shows a schematic representation of a multi-level furnace according to a third exemplary embodiment.

In terms of the form of the multi-level furnace, the exemplary embodiment according to FIG. 3 corresponds to the exemplary embodiment according to FIG. 1. However, a transfer device 24 formed as a chute 24.1 is provided between the two process chambers 1 and 2. The shaft-like chute 24.1 is connected directly to the opening 8.1 in the floor for the level 8 and ends above the floor for the level 9, and so a conical heap forms between the end of the chute 24.1 and the floor for the level 9. Also in the case of this exemplary embodiment, gastight separation of the two process chambers 1 and 2 is ensured by the column of material 26, which here forms in the chute 24.1. It is therefore required that the delivery rate at which the material flow moves on the floor for the level 9 and is fed to the floor for the next-lowest level 10 is set and possibly regulated in such a way that a sufficient column of material 26 to ensure the gastight separation has always formed in the transfer device 24. The delivery rate of the material flow on the floors for the levels is ensured here by the rabble arm system 27 rotating with the central column 13. It is therefore entirely appropriate if the rabble arm systems of the upper process chamber 1 and the lower process chamber 2 can be regulated in their speed independently of one another. For checking the gastight separation of the two process chambers, and possibly also for regulating the speeds of the rabble arm systems, the differential pressure between the two process chambers may also be determined in the case of this exemplary embodiment.

The exemplary embodiment represented in FIG. 3 is distinguished by a transfer device of a simple construction. However, here it is not possible for material to be discharged or fed in from outside in the region of the transfer device.

Figure 4:
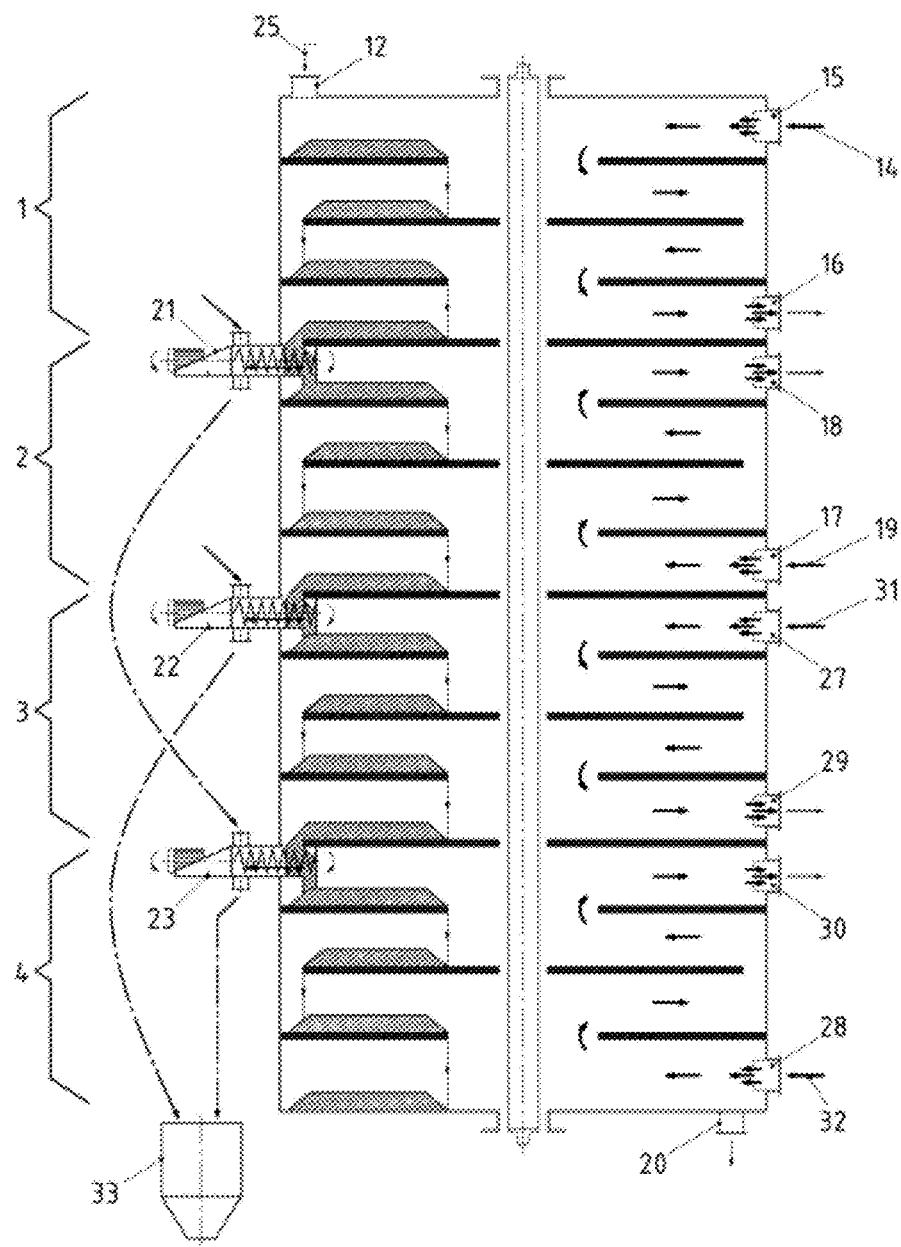

A multi-level furnace with four process chambers 1, 2, 3 and 4 arranged one above the other is represented in FIG. 4. Provided between the individual process chambers are transfer devices 21, 22 and 23, which are configured according to FIG. 2. Each of the process chambers 1 to 4 may be subjected by way of inputs 15, 17, 27, 28 to individual streams of treatment gas 14, 19, 31, 32, which are discharged again by way of outputs 16, 18, 29 and 30. In this way, a specific charge can be assigned to each process chamber. Thus, for example, drying may take place in the process chamber 1, heating, calcination or torrefaction may take place in the process chambers 2 and 3 and cooling of the material flow may take place in the process chamber 4.

The specific form of the transfer devices 21 to 23 makes it possible for part of the material flow to be discharged, in order that, while bypassing individual process chambers, it is fed again to a process chamber lying further below or discharged prematurely and charged to a material store 33.

In the exemplary embodiment represented, for example, a partial flow of the material flow treated in the first process chamber 1 is discharged by way of the transfer device 21 and fed to the fourth process chamber by way of the transfer device 23. As a result, a dried and cooled material flow that has not undergone torrefaction can be obtained for example.

It is also provided that a partial flow is discharged by way of the second transfer device 22 or the third transfer device 23 and charged directly to the material store 33.

The material flows thereby discharged have been partially or completely thermally treated, but not cooled. Depending on the application, other bypassing or discharging operations may also be provided within the scope of the invention.

The gastight separation of process chambers arranged one above the other allows the temperature and/or the humidity and/or the pressure and/or the atmosphere in each of the process chambers to be set individually by way of the stream of treatment gas fed in. In addition, there is the possibility of individually setting the direction of flow of the treatment gas with respect to the direction of the material flow for each process chamber, in that the treatment gas is fed to the respective process chamber either at the top or at the bottom. This allows the direction of flow of the treatment gas to be set according to choice in co-flow, in cross-flow or in counter-flow with respect to the material flow. Depending on whether the process chamber is used for drying, thermal treatment (torrefaction, calcination, heating) or cooling, the direction of flow of the treatment gas with respect to the material flow that is preferred for the respective application can be selected in each case. It would also be conceivable within the scope of the invention that separate treatment gases are fed in and removed, at least for individual levels. In this case, one would say that the stream of treatment gas is fed in and removed in cross-flow with respect to the material flow.

The invention claimed is:

1. A method for the thermal treatment of a material flow in a multi-level furnace, the material flow being treated in at least two process chambers arranged one above the other and separated gastightly from one another and respectively equipped with at least two floors for the levels, and the material flow being transferred by a transfer device from an upper process chamber to a lower process chamber, wherein a column of material is formed in the transfer device for the gastight separation of the two process chambers, the forming of the column of material being performed by at least one delivery unit for transferring the material flow from the upper process chamber to the lower process chamber, the at least one transfer device comprising an outlet opening for discharging at least part of the material flow from the multi-level furnace and a feed opening for introducing material into the multi-level furnace from outside.

2. The method as claimed in claim 1, wherein a differential pressure between the upper process chamber and the lower process chamber is determined, in order to monitor the gastight separation of the two process chambers.

3. The method as claimed in claim 1, wherein a temperature and/or a humidity and/or a pressure and/or an atmosphere in the at least two process chambers can be set individually.

4. The method as claimed in claim 1, wherein a delivery rate of the at least one delivery unit is controlled in dependence on the measured differential pressure in such a way that a gastight separation of the two process chambers is ensured.

5. A method for the thermal treatment of a material flow in a multi-level furnace, the material flow being treated in at least two process chambers arranged one above the other and separated gastightly from one another and respectively equipped with at least two floors for the levels, and the material flow being transferred by a transfer device from an upper process chamber to a lower process chamber, wherein a column of material is formed in the transfer device for the gastight separation of the two process chambers, the forming of the column of material being performed by at least one delivery unit or at least one chute or a slider and the at least one transfer device being used not only for transferring the material flow from the upper process chamber to the lower process chamber but also for discharging at least part of the material flow from the multi-level furnace and/or for introducing material into the multi-level furnace from outside, and wherein the material flow is treated in at least three process chambers gastightly separated from one another, part of the material flow being fed from an upper process chamber to a lower process chamber while bypassing a middle process chamber.

6. The method as claimed in claim 1, wherein each process chamber is fed at least one stream of treatment gas, which after acting on the material flow is removed again.

7. The method as claimed in claim 6, wherein a direction of flow of the treatment gas with respect to a direction of material flow is set individually in the at least two process chambers.

* * * * *